US008782803B2

(12) United States Patent
McDonald et al.

(10) Patent No.: US 8,782,803 B2
(45) Date of Patent: *Jul. 15, 2014

(54) SYSTEM AND METHOD OF ENCRYPTING A DERIVATIVE WORK USING A CIPHER CREATED FROM ITS SOURCE

(75) Inventors: Omid Allen McDonald, Ottawa (CA); David Ross McDonald, Ottawa (CA)

(73) Assignee: Legitmix, Inc., Ottawa (CA)

( * ) Notice: Subject to any disclaimer, the term of this patent is extended or adjusted under 35 U.S.C. 154(b) by 423 days.

This patent is subject to a terminal disclaimer.

(21) Appl. No.: 12/760,091

(22) Filed: Apr. 14, 2010

(65) Prior Publication Data

US 2011/0258440 A1 Oct. 20, 2011

(51) Int. Cl.
*G06F 7/04* (2006.01)
*G06F 21/10* (2013.01)
*H04L 9/08* (2006.01)
*G11B 20/00* (2006.01)

(52) U.S. Cl.
CPC .............. *G06F 21/10* (2013.01); *H04L 9/0866* (2013.01); *G11B 20/00086* (2013.01); *Y10S 705/901* (2013.01)
USPC ................. 726/27; 380/44; 380/281; 705/51; 705/57; 705/59; 705/901; 726/26

(58) Field of Classification Search
None
See application file for complete search history.

(56) References Cited

U.S. PATENT DOCUMENTS

| 5,787,125 | A | 7/1998 | Mittel |
| 6,076,077 | A | 6/2000 | Saito |
| 7,351,904 | B2 | 4/2008 | Tamori |
| 8,131,737 | B2 | 3/2012 | Ramer et al. |
| 2003/0152233 | A1* | 8/2003 | Filippi ........................ 380/277 |
| 2003/0212886 | A1 | 11/2003 | Sugiura |
| 2004/0022444 | A1 | 2/2004 | Rhoads |
| 2004/0073789 | A1 | 4/2004 | Powers |
| 2004/0205028 | A1* | 10/2004 | Verosub et al. ................ 705/59 |
| 2005/0043960 | A1 | 2/2005 | Blankley |

(Continued)

FOREIGN PATENT DOCUMENTS

| EP | 1 146 714 A1 | 10/2001 |
| WO | WO-9714087 | 4/1997 |

(Continued)

OTHER PUBLICATIONS

International Search Report and Written Opinion; Legitmix, Inc. et al. issued by ISA/CA for PCT/CA2011/000384; Aug. 15, 2011 (7 pgs).

(Continued)

*Primary Examiner* — Alexander Lagor
(74) *Attorney, Agent, or Firm* — J. Bennett Mullinax

(57) ABSTRACT

A derivative work is encrypted using a cipher created from digital sources used to create the derivative work. A software application made available for download permits a mix artist to generate a derivative-encrypted work from a derivative work that the mix artist has created using one or more of the digital sources. The derivative-encrypted work is streamed to a worldwide web server, where it is made available for download by consumers for a fee. The software application is also available for download by the consumers and permits the consumers to purchase and download any available derivative-encrypted work. However, the derivative-encrypted works can only be decrypted if the consumer has possession of a digital source for each of the source art works associated with the digital sources used to create the derivative work.

18 Claims, 4 Drawing Sheets

(56) References Cited

U.S. PATENT DOCUMENTS

| | | | |
|---|---|---|---|
| 2005/0097365 A1* | 5/2005 | Alldredge | 713/201 |
| 2006/0013435 A1 | 1/2006 | Rhoads | |
| 2006/0112015 A1 | 5/2006 | Chancellor et al. | |
| 2006/0195512 A1 | 8/2006 | Rogers et al. | |
| 2006/0195516 A1 | 8/2006 | Beaupre | |
| 2006/0217828 A1 | 9/2006 | Hicken | |
| 2006/0233446 A1* | 10/2006 | Saito et al. | 382/232 |
| 2006/0253433 A1 | 11/2006 | Kim et al. | |
| 2007/0076798 A1 | 4/2007 | Imahashi et al. | |
| 2007/0076877 A1* | 4/2007 | Camp et al. | 380/255 |
| 2007/0078876 A1 | 4/2007 | Hayashi et al. | |
| 2007/0100806 A1 | 5/2007 | Ramer et al. | |
| 2007/0116285 A1* | 5/2007 | Nakai et al. | 380/255 |
| 2008/0209222 A1* | 8/2008 | Narayanaswami et al. | 713/184 |
| 2008/0240444 A1 | 10/2008 | Shuster | |
| 2009/0018898 A1 | 1/2009 | Genen | |
| 2009/0077377 A1* | 3/2009 | Cobelo et al. | 713/165 |
| 2009/0182736 A1 | 7/2009 | Ghatak | |
| 2009/0228423 A1 | 9/2009 | Hicken et al. | |
| 2010/0014558 A1 | 1/2010 | Nieto et al. | |
| 2012/0069131 A1 | 3/2012 | Abelow | |

FOREIGN PATENT DOCUMENTS

| | | | |
|---|---|---|---|
| WO | WO2006/057639 | 6/2006 | |
| WO | WO-2006057639 | 6/2006 | |
| WO | WO-2007091189 | 8/2007 | |
| WO | WO 2007091189 A2 * | 8/2007 | G06F 21/00 |
| WO | WO 2007/106798 A2 | 9/2007 | |
| WO | WO 2008/004971 A1 | 1/2008 | |
| WO | WO2011027564 | 10/2011 | |

OTHER PUBLICATIONS

International Search Report and Written Opinion; Legitmix, Inc. et al; issued by ISZ/CA for PCT CA2011/000384; Aug. 15, 2011 (7 pages).

International Written Opinion PCT/CA2011/001098; Dec. 21, 2011.

International Preliminary Report on Patentability: pCT/CA2011/001098; Legitmix, Inc. et al.; Apr. 27, 2012; Canadian International Patent Office.

* cited by examiner

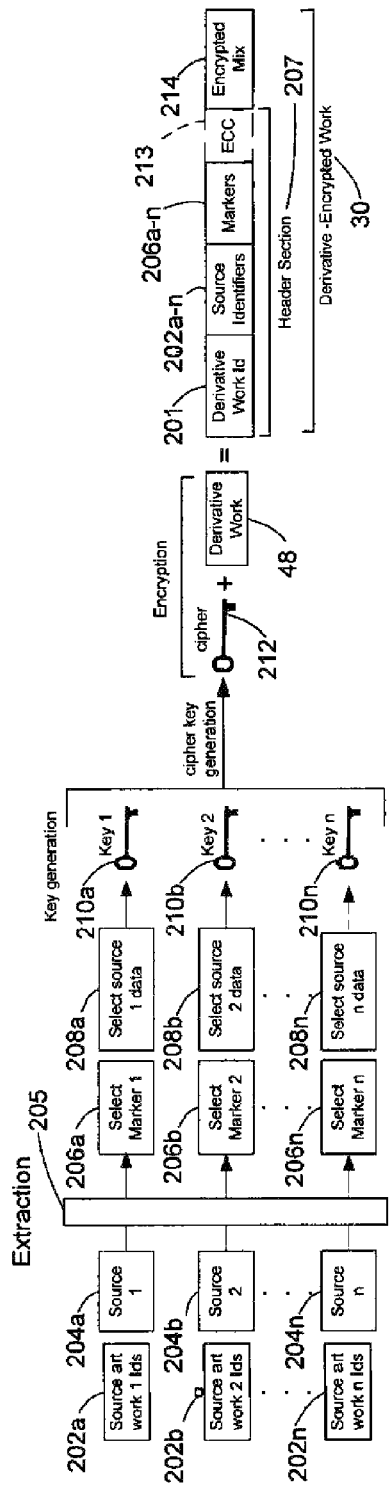
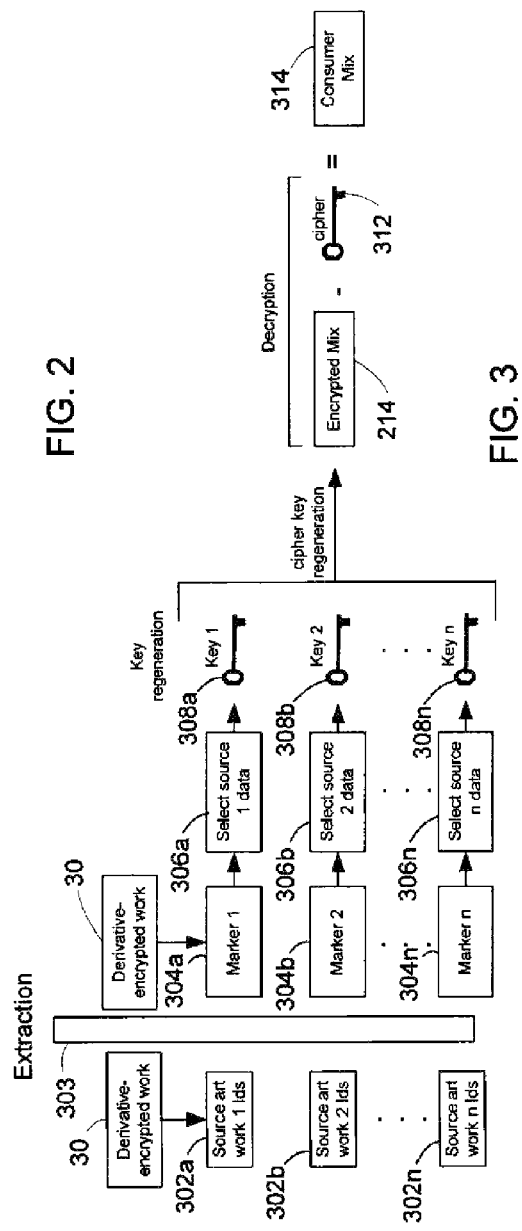
FIG. 2
FIG. 3

SYSTEM AND METHOD OF ENCRYPTING A DERIVATIVE WORK USING A CIPHER CREATED FROM ITS SOURCE

RELATED APPLICATIONS

This is the first application filed for this invention.

FIELD OF THE INVENTION

This invention relates in general to the legal distribution of digital content through public channels such as the Internet and, in particular, to a system and method of encrypting a derivative work using a cipher created from its sources to ensure the legal distribution of the derivative work through the public channels.

BACKGROUND OF THE INVENTION

The art form known as "mixing" involves using electronic devices to modify the digital content of one or more digital sources to produce a derivative work of art called the "mix". The digital sources may be, for example, digital audio, digital video, or digital photographic works that are mixed in any combination. The mix can be recorded but if the source content is copyrighted, distribution of the mix to consumers requires that permission be obtained from the source copyright holder(s). This limits the ability of mix artists to share or monetize their work.

For example, the musical art form known as "mixing" involves using electronic devices to modify one or more source audio recordings to produce a new music work called the mix. Similarly, the acoustical characteristics of the digital content of one or more source audio recordings can be used to produce a soundtrack (the mix) for a video or a motion picture.

The visual art form known as "mashups" involves using electronic devices to modify the digital content of one or more source video recordings to produce a new work of art called the "mashup" or a "video mix". The video mix can be recorded, but if the source video recording(s) is copyrighted, or a source audio recording incorporated into the video is copyrighted, the distribution of the video mix requires permission of the source copyright holder(s).

Since any mix may include portions of one or more copyrighted sources, it is generally difficult and expensive to obtain the copyright permissions required to distribute the mix. This is particularly egregious to an artist who has no means of gauging the commercial value of their mix before it is distributed. Methods of creating mix instruction files that recreate mixes directly from copies of the sources have therefore been invented, as described for example in International application publication number WO 2008/004791 A1 published on Jan. 10, 2008. The mix instruction file can be distributed without copyright violation since it uses the original sources to recreate the mix. However, mix instruction creation equipment has limitations and can be expensive.

There therefore exists a need for a simple method of permitting mix artists to legally distribute their mixes without the requirement of acquiring mix instruction creation equipment.

SUMMARY OF THE INVENTION

It is therefore an object of the invention to provide a simple and reliable system and method of encrypting a derivative work using a cipher created from its sources to enable the legal distribution of works derived from copyrighted sources.

The invention therefore provides a method of encrypting a derivative work using a cipher created from digital sources used to create the derivative work in order to ensure a legal distribution of the derivative work through public channels, comprising: obtaining machine-readable input from a creator of the derivative work that provides an identification of each digital source used to create the derivative work; extracting source data from each digital source; selecting a portion of the source data to generate a respective encryption key associated with each digital source; generating the respective encryption keys using the selected portions of source data; combining the respective encryption keys to create the cipher; encrypting the derivative work using the cipher to create a derivate-encrypted work; storing the derivative-encrypted work on a public server; and, making the derivative-encrypted work available on the public server for purchase by a consumer through the public channels.

The invention further provides a system for ensuring a legal distribution of a derivative work through public channels, comprising: a derivative work service server having a non-volatile memory, the derivative work service server being connected to a public network in such a way that it can be accessed by mix artists and consumers; and a software application stored on the non-volatile memory and freely available for download by the mix artists and the consumers, the software application comprising machine-executable code that permits the mix artists to upload derivative-encrypted works, which are derivative works encrypted using an encryption cipher derived from digital sources used to create the derivative work, and the software application further comprising machine-executable code that permits the consumers to purchase derivative-encrypted works and download the derivative-encrypted works, and to decrypt the derivative-encrypted works provided that the consumers are respectively in possession of a digital source for each source art work associated with respective digital sources used by the respective mix artists to create the respective derivative-encrypted works purchased by the respective consumers.

The invention yet further provides a derivative-encrypted work, comprising: an encrypted mix created from a derivative work encrypted using an encryption cipher created from encryption keys generated from digital sources used to create the derivative work; and a header section containing source art work identifiers that identify a source art work associated with each digital source used to encrypt the encrypted mix, as well as a marker associated with each digital source that indicates a start point in source data extracted for each digital source for generating a decryption key to create a decryption cipher to decrypt the encrypted mix.

BRIEF DESCRIPTION OF THE DRAWINGS

The embodiments of the present invention will now be described by reference to the following drawings, in which identical reference numerals in different figures indicate identical elements, and in which:

FIG. 2 is a visual overview of a process executed by an A/C application in accordance with the invention when a mix artist uploads a derivative work to a derivative work service server in accordance with the invention;

FIG. 3 is a visual overview of a process executed by an NC application in accordance with the invention when a consumer purchases and downloads a derivative-encrypted work from a derivative work service server in accordance with the invention;

DETAILED DESCRIPTION OF THE PREFERRED EMBODIMENTS

Figure 1:
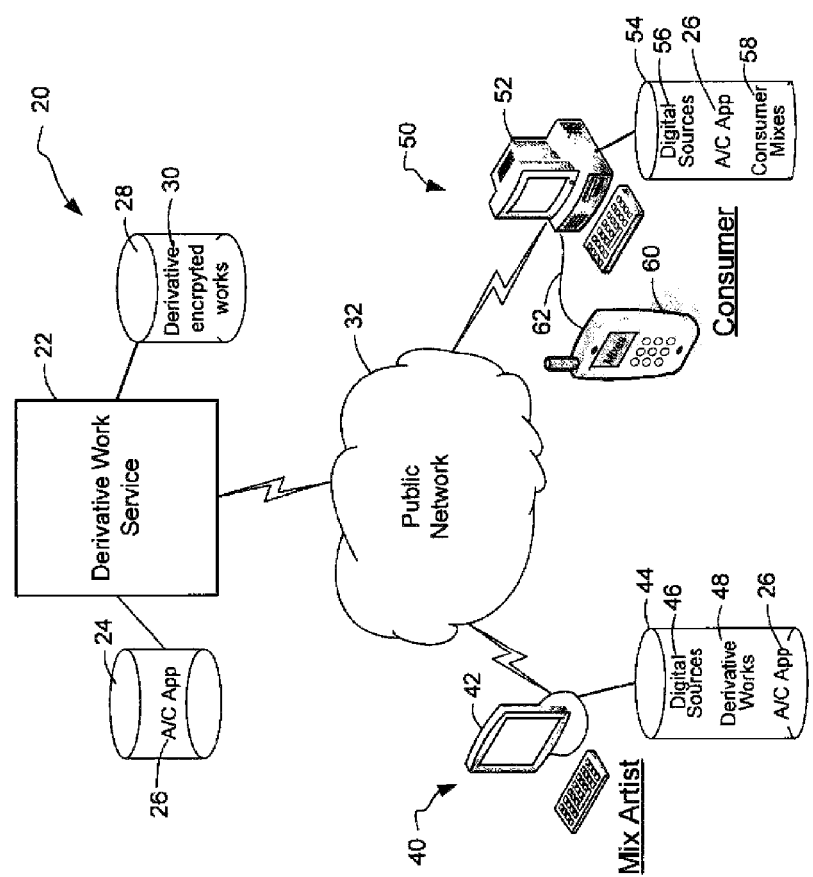
FIG. 1 is a schematic diagram of a system in accordance with one embodiment of the invention.

The present invention provides a system and method of encrypting a derivative work using a cipher created from the digital sources used to create the derivative work, to ensure the legal distribution of the derivative work through public channels. A worldwide web component of the system makes available for download a software application (A/C app) to permit a mix artist to generate a derivative-encrypted work from a derivative work that the mix artist has created using one or more digital sources. The derivative-encrypted work is streamed to a worldwide web component of the system, where it is made available for download by consumers for a fee. The NC app is also available for download by the consumers and permits the consumers to purchase and download any available derivative-encrypted work. However, any given derivative-encrypted work can only be decrypted by the A/C application if the consumer has possession of a digital source for each of the source art works used to create the derivative work.

DEFINITIONS

As used herein, "source art work" means any audio work, video work, photographic work or mixed-media work in human-cognizable form which can be uniquely identified by title, artist, version, etc.

As used herein, "digital source" means a digital encoding of a source art work stored in any machine-readable format. There can be any number of digital sources for a given source art work.

As used herein, "source data" means a native, uncompressed digital encoding of a source art work extracted from a digital source. The source data for any source art work is substantially invariant, regardless of the digital source from which it is extracted.

As used herein, "derivative work" means any audio work, video work, photographic work or mixed-media work derived in whole or in part from one or more digital sources.

As used herein, a "mix artist" means any person or combination of persons who, directly or indirectly, creates a derivative work.

As used herein, "encrypted mix" means a derivative work that has been encrypted using an encryption cipher derived from the digital sources used to create the derivative work.

As used herein a "derivative-encrypted work" means an encrypted mix, derivative work identifiers, and associated information required by a corresponding decryption algorithm to decrypt the encrypted mix. There is no information in the derivative-encrypted work that can be used to recreate the derivative work, or any portion of any of the digital sources used to create the derivative work without possession of the corresponding decryption algorithm, the derivative-encrypted work and a copy of each of the digital sources used to create and encrypt the derivative work.

As used herein, a "consumer mix" means any derivative work regenerated from an encrypted mix.

As used herein, "consumer" means any person or entity that purchases a derivative-encrypted work for the purpose of having access to a consumer mix.

As used herein, "derivative work service" means a publicly accessible network service that operates to provide an online forum where mix artists can legally post their derivative works for sale, and consumers can legally purchase those derivative works.

As used herein. "A/C app" means machine-executable programme instructions that permit a mix artist to upload a derivative work to the derivative work service where it becomes publically available as a derivative-encrypted work, and permits a consumer to purchase a derivative-encrypted work, which is converted by the A/C app to a consumer mix.

System Overview:

FIG. 1 is a schematic diagram of a system 20 in accordance with one embodiment of the invention. A principle component of the system 20 is a worldwide web server that supports a derivative work service in accordance with the invention, hereinafter referred to as the derivative work service server 22. The derivative work service server 22 is supplied with non-volatile memory, such as one or more hard disks 24, 28, for example. The non-volatile memory is used to store the A/C app 26, which will be described below in more detail. The A/C app 26 may be implemented as a single computer-executable code having features used by both the artist and the consumer, or as separate artist and consumer applications, as a matter of design choice. The A/C app 26 is freely available for download via a public network 32 by both artists and consumers. The non-volatile memory 24, 28 is also used to store derivative-encrypted works created by mix artists using the mix artist's features of the A/C app 26, as will also be explained below in more detail.

A mix artist 40 uses a mix artist's system 42, a personal computer for example having a non-volatile memory 44, to create derivative works 48 from one or more digital sources 46 using tools and/or methods that are known in the art. Once a derivative work 48 has been created, the mix artist 40 may use features of the NC app 26 to upload the derivative work 48 to derivative work service server 22 via the public network 32. The upload process creates a derivative-encrypted work 30, which is streamed to the derivative work service server 22. In accordance with one embodiment of the invention, the derivative-encrypted work 30 does not persist in the non-volatile memory 44, but the original derivative work 48 is unaffected and untransformed by the upload operation.

A consumer 50 uses a consumer's system 52, a personal computer for example having a non-volatile memory 54, to download the A/C app 26. The consumer 50 uses consumer features of the A/C app 26 to browse and purchase derivative-encrypted works 30 made available on the derivative work service server 22 by the mix artists 40. If the consumer 50 indicates an intention to purchase a derivative-encrypted work 30 from the derivative work service server 22, the A/C app 26 verifies, with input from the consumer 50 if required, that the non-volatile memory 54 stores, for each source art work used to create the derivative work 58, a digital source 56 required to decrypt the derivative-encrypted work 30. There is no requirement that the digital source 56 be an exact duplicate of the digital source 46 used by the mix artist 40 to create the derivative work 48, since some minor differences between the two digital sources may exist due to storage media type, compression, etc. However, the source art work(s) identified by the mix artist 40 must be identifiable among the digital sources 56 possessed by the consumer 50. If one or more of the digital sources 56 are not available from the non-volatile memory 54, a warning message is displayed and an option to purchase the missing digital source(s) may also be displayed, using push mechanisms that are known in the art. If, or after, a digital source 56 for each source art work used to create the derivative work 48 is available on the non-volatile memory 54, the A/C app 26 streams the purchased derivative-encrypted work from the derivative work service server 22, decrypts the derivative-encrypted work 30 as will be explained below in detail, and stores on the non-volatile memory 54 a resulting consumer mix 58 that is regenerated from the decrypted derivative-encrypted work 30. The derivative-encrypted work 30 does not persist on the non-volatile memory 54. The consumer mix 58 is then available to the consumer 50, and may be played/viewed using the consumer's system 52, or any other personal device 60 to which the consumer mix 58 is communicated using a communications link 62, which may be a tether, Bluetooth® connection, or the like.

Method Overview:

FIG. 2 is a visual overview of a process executed by the A/C app 26 when the mix artist 40 uploads a derivative work to the derivative work service server 22 created from digital sources 46. After the mix artist 40 has created the derivative work 48, the mix artist 40 uses the NC app 26 stored on artist system 42 to identify and upload the derivative work 48 to the derivative work service server 22. To do so, the mix artist 40 provides a derivative work identification (derivative work Id) 201, and then identifies all source art works used to create the derivative work 48. As shown in FIG. 2, each source art work is identified by supplying source art work identifiers 202a-202n (title, artist, version, etc.) to the A/C app 26. The source art work identifiers 202a-202n can be supplied using any convenient mechanism, such as a predefined form, for communicating that information to the A/C app 26. When the mix artist 40 indicates that all of the source art works used to create the derivative work 48 have been identified, the A/C app 26 searches the non-volatile memory 44 for a digital source 46 associated with the respective source art work identifiers. The mix artist 40 may be prompted to assist by inputting digital source identification or location information using a browse utility, or the like. After each digital source has been located, the NC app 26 sequentially opens 204a-n each digital source 46 and inspects the digital source header information to determine how the digital source is encoded (MP3 data, for example). The A/C app 26 extracts 205 the source data from the digital source using methods known in the art before further processing can proceed. After extraction 205, the A/C app 26 inspects the source data to locate 206a-206n a distinctive data sequence that will be used as a marker to identify a key creation start point to a corresponding decryption algorithm, as will be explained below with reference to FIG. 3. The marker may be any digital sequence that can be uniquely re-identified within the source data of another digital source given an associated location stamp (a time offset into the digital source, for example). In one embodiment, the A/C app 26 selects the respective markers (1-n) using a randomly generated search-point offset to ensure that a subsequent encryption key created from the same digital source will be unique to the particular derivative work 48 with which the digital source is associated. However, as will be understood by those skilled in the art, other methods can be used to ensure that a key extracted from a digital source is unique to the derivative work with which it is associated.

The marker need only be unique within a limited range of the source data, to ensure that the decryption algorithm can relocate the marker if the source data of a digital source 56 possessed by the consumer is not identical to that of the source data of the digital source 46 possessed by the mix artist 40. After each marker is selected, the marker and associated location stamp are encoded using any predetermined encoding algorithm. Any information required by the decryption algorithm to decrypt the encrypted mix including the encoded marker, location stamp and the length of the source data used to create the key are recorded in a header section 207 of the derivative-encrypted work 30.

The A/C app 26 then selects 208a 208n a predefined portion of the source data following the marker to create an encryption key. In one embodiment, a significant portion of the source data is selected, e.g. from about a megabyte up to as much as ¾ of the source data. The method of key creation using a significant portion of the source data ensures the key can only be recreated though possession of a digital source of the source art work. The selected source data is then processed to generate a key 210a-n, as will be explained below in more detail with reference to FIGS. 4 and 5. After each of the keys 210a-210n have been created, the respective keys 210a-n are combined to create a cipher 212, as will also be explained below in more detail with reference to FIGS. 4 and 5. The A/C app 26 then uses the cipher 212 to encrypt the derivative work 48, an example of which will be explained below in detail. The encrypted derivative work 48 becomes an encrypted mix 214 which is not invertible without the corresponding decryption algorithm and a digital source for each source art work used to create the derivative work 48. The derivative-encrypted work 30 includes the header section 207 that stores: the derivative work Id 201; source identifiers 202a-n; the encoded markers 206a-n; and, optionally, error correction codes (ECC) 213. The encrypted mix 214 is appended to the header section 207 of the derivative-encrypted work 30. The derivative-encrypted work 30 is streamed to the derivative work service server 22 where it is catalogued using the derivative work Id 201, and made available to the public. If any parts of the derivative-encrypted work 30 are created on the artist system 42, those parts do not persist. As explained above, the contents and location of the derivative work 48 is unaffected by any of these operations.

FIG. 3 is a visual overview of a process executed by the NC app 26 when the consumer 50 purchases and downloads the derivative-encrypted work 30 from the derivative work service server 22, which was uploaded to the server 22 as described above with reference to FIG. 2. As explained above with reference to FIG. 1, the derivative-encrypted work 30 can be decrypted only if the consumer possesses a digital source 56 for each of the source art works used by the mix artist to create the derivative work 48. After the derivative-encrypted work 30 has been streamed to the consumer system 52, the A/C app 26 extracts the header information from the header section 207 of the derivative-encrypted work 30 to obtain the source art work identifiers 302a-n that indicate the digital sources 56 required to decrypt the encrypted mix 214. The consumer 50 may be prompted for digital source identification and/or location information, if required. The A/C app 26 then performs an extraction operation 303 to extract the source data from the respective digital sources 56. The A/C app 26 also extracts and decodes 304a-n the markers (1-n) that identify the respective starting points used in the source data extracted from each digital source 56 to generate the decryption keys. The app 26 uses the respective markers to sequentially locate the respective starting points in the source data extracted from the respective digital sources 56. If any digital source 56 is not identical to the corresponding digital source 46, statistical fitting is used to locate the starting point in the source data extracted from that digital source 56. The selected source data is processed as will be explained below in more detail to generate the decryption keys, and the generated decryption keys 308a-n are used to generate the decryption cipher. In one embodiment the encrypted mix 214 is decrypted by reversing the encryption process, examples of which are described below in more detail with reference to FIGS. 4 and 5. The output of the decryption process is a consumer mix 314, which is stored by the NC app 26 on the non-volatile memory 54 of the consumer system 52. If any parts of the derivative-encrypted work 30 are created on the consumer system 52, those parts do not persist after the consumer mix 314 has been generated and stored.

Figure 4:
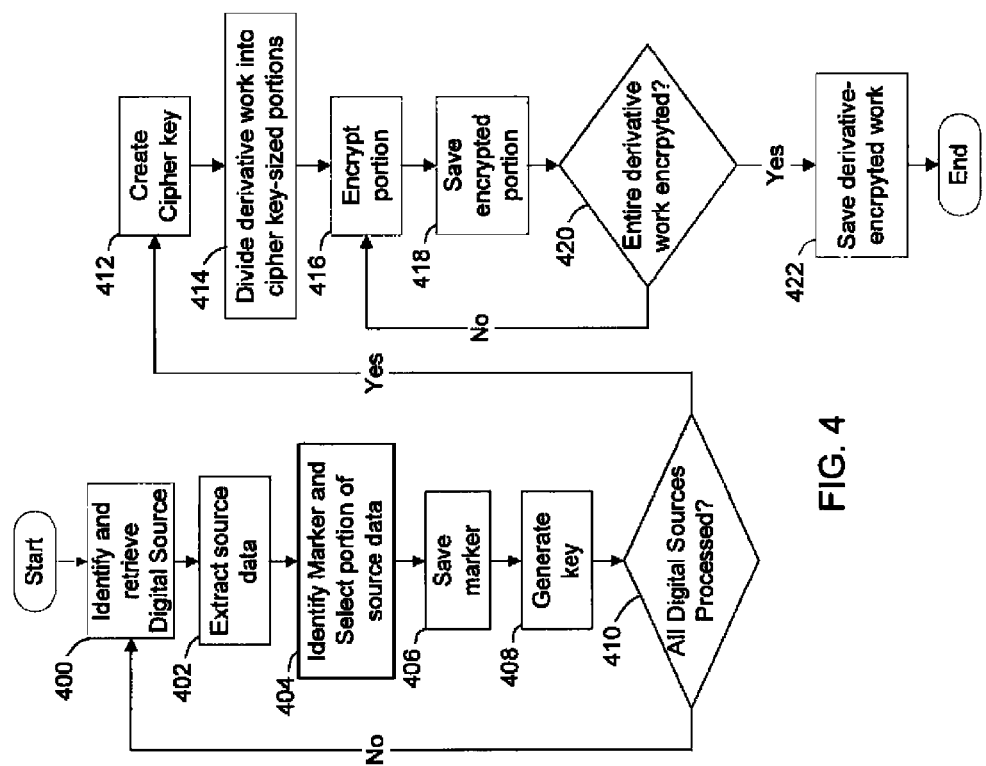
FIG. 4 is a flow chart characterizing principal steps performed to encrypt a derivative work to create a derivative-encrypted work.

Encryption/Decryption:

FIG. 4 is a flow chart characterizing principal steps performed to encrypt a derivative work 48 to create a derivative-encrypted work 30, as described above with reference to FIG. 2. As explained above, the process begins by identifying and retrieving (400) each of the digital sources 46 used to create the derivative work 48. The source data is extracted (402) using methods known in the art. The source data of each digital source 46 is then examined (404) from a starting point, which may be randomly generated or otherwise selected to ensure that it is uniquely associated with the derivative-encrypted work, to identify a distinctive data sequence that can serve as a marker for key regeneration by the subsequent decryption process, as also described above with reference to FIG. 2. Once the marker is identified a subsequent portion of the source data is selected to generate the encryption key associated with that digital source 46, and the marker is encoded and saved (406).

The encryption key is then generated (408). Although the key generation and encryption processes in accordance with the invention can be utilized to generate keys using any digital data including software programs, an example will now be described with reference to audio sources. Typically, the source data of an audio digital source is represented in its native form as Pulse Code Modulation (PCM) digital data where each pulse is represented as a sixteen-bit integer. Normally two tracks of PCM data are recorded this way (left and right stereo); hence, a pair of sixteen-bit integers is recorded at a predetermined sampling rate, which is generally 44,100 samples per second. For each digital source 46 the encryption key is generated by copying of a significant portion of the PCM data from the digital source 48. Each data value (e.g. 16-bit integer of PCM data) in this portion is then rounded to preserve only higher order bits in order to create the key.

It is then determined if all of the digital sources 46 have been processed (410). If not, a next digital source 46 is indentified and the process described above with reference to steps (402)-(408) is repeated. When all digital sources 46 have been processed, the cipher is created (412). In one embodiment of the invention, the cipher is created by Exclusive ORing (XORing) the keys together. If the keys are not of equal length, the key data is recycled to ensure all keys are of equal length. If only one digital source 46 was used to create the derivative work 48, the key generated at (408) is the cipher. To create the encrypted mix 214 (FIG. 2), the derivative work 48 is divided (414) into cipher-sized portions. Subsequently, the cipher is XORed with a cipher-sized portion of the derivative work 48. The result is a cipher-sized portion of the encrypted mix 214. When the end of the cipher is reached, it is determined (420) if the entire derivative work has been encrypted. If not, the next portion of the derivative work is encrypted as described above. This is repeated until the entire derivative work has been encrypted to create the encrypted mix 214. Once the encrypted mix 214 has been created, it is appended to the information required by the decryption algorithm to decrypt the encrypted mix, including the source identifiers 201a-n and the encoded markers 206a-n to create the derivative-encrypted work 30, as explained above with reference to FIG. 2.

Figure 5:
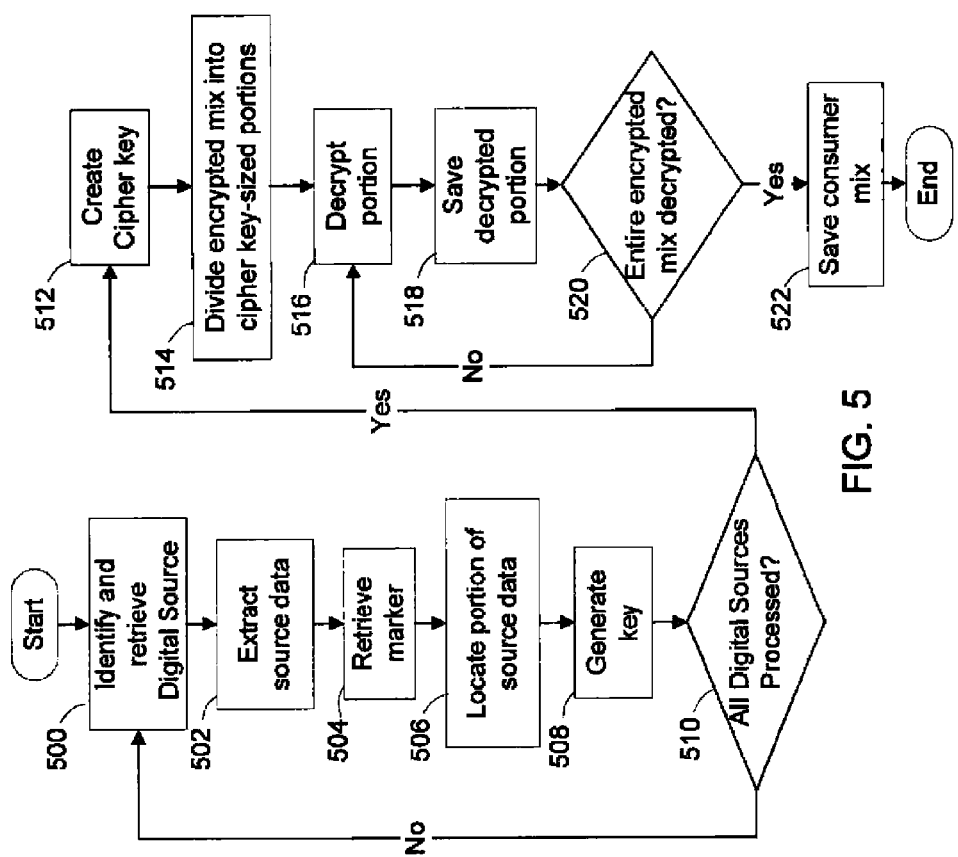
FIG. 5 is a flow chart characterizing principal steps performed to decrypt an encrypted mix to generate a consumer mix.

FIG. 5 is a flow chart characterizing principal steps performed to decrypt an encrypted mix 214 to generate a consumer mix 314 (see FIG. 3). As explained above with reference to FIG. 3, the consumer 50 has purchased and downloaded a copy of the derivative-encrypted work 30 from the derivative work service server 22, and the A/C app 26 has confirmed that the consumer 50 possesses a digital source 56 for each source art work required to regenerate the consumer mix 314. The decryption proceeds exactly as described above with reference to FIG. 4 to create a cipher identical to the one used for encryption. Consequently, the A/C app 26 locates and retrieves (500) a digital source 56 for each of the source art works identified 202a-n in the header section 207 of the derivative-encrypted work 30. The source data is extracted (502) from the digital source. The markers 206a-n are then retrieved (504) from the header section 207 of derivative-encrypted work 30 and decoded. The key generation portion of the source data extracted from each digital source is located (506) and copied. The key is then generated (508) by rounding the PCM data to preserve only higher order bits to generate the key, all as described in more detail above with reference to FIG. 4. The cipher is then created (512) by XORing together the respective keys. The encrypted mix 214 is then divided (514) into cipher-sized portions, and each portion is decrypted (516) by XORing the cipher with the cipher-sized portion of the encrypted mix 214 until it is determined (520) that the entire encrypted mix 214 has been decrypted to generate the consumer mix 314. The consumer mix 314 is then saved (522) and the process ends.

As will be understood by those skilled in the art, the source data used during the decryption processes described above may not be exactly the same as that used during the encryption process because the digital sources 56 possessed by the consumer 50 may differ slightly from those digital sources 46 used by the mix artist 40 to create the derivative work 48. Consequently, the rounding transformation described above is used to ensure that the key calculated from source data extracted during encryption and the key calculated from slightly different source data extracted during decryption will be identical. Consequently the consumer mix 314 will be identical to the derivative work.

Error Correction:

In another embodiment, in addition to determining the key creation start point, the marker is also used to fit a multiplicative correction factor to the source data extracted from each digital source. The multiplicative correction factor is computed by comparing a mean of the PCM values of the marker found on the consumer's digital source 302a-302n with a mean of the PCM values of the corresponding marker 206a-n stored in the header section 207 of the derivative-encrypted work 30. The multiplicative correction factor is a ratio of these two means. The significant portion of the source data that is used for decryption key generation, as described above with reference to FIG. 5, is multiplied by this correction factor before the decryption key is generated. This correction factor adjusts for different volume settings between different digital sources.

In another embodiment, additional the error correcting codes (ECC) 213 are calculated and stored in the header section 207 of the derivative-encrypted file 30 (see FIG. 2) in order to ensure that the decryption key(s) are identical to the encryption key(s) used to produce the encrypted mix 214.

In yet another embodiment, the encryption/decryption process is modified to accommodate situations where the key generated from source data extracted from a digital source 46 during encryption is slightly different from the key generated from source data extracted from a slightly different digital source 56 during decryption. When creating the cipher 412, the generated keys are added together (rather than XORed), two sixteen-bit pairs of integers at a time. When encrypting, the cipher is added (rather than XORed) to the cipher-sized portion of source data extracted from the derivative work (rather than directly to the cipher-sized portion of the derivative work), two sixteen bit pairs of integers at a time. When decrypting, the cipher is subtracted (rather than XORed) from the cipher-sized portion of source data extracted from the encrypted mix (rather than directly to the cipher-sized portion of the encrypted mix), two sixteen bit pairs of integers at a time. In all other respects, encryption and decryption proceeds as described above with reference to FIGS. 4 and 5.

Although the invention has been described above with reference to a particular encryption/decryption algorithm for encrypting and decrypting a derivate work, it should be understood that any encryption/decryption algorithm may be used so long as it generates encryption keys from the digital sources used to create the derivative work and generates decryption keys from a digital source(s) for the same source art work(s). The algorithm described above is particularly efficacious because it is forgiving of minor perturbations between different digital sources of the same source art work. However, other equally appropriate algorithms may become apparent to those skilled in the art.

Furthermore, although the invention has been described with reference to the legal distribution of derivative works, it should be understood that the invention has much broader application. For example, the invention may be adapted to the distribution of software programmes, including video games, in which a new version of a software programme is encrypted using data extracted from a previous version of the software programme to ensure that a party that downloads the new version possesses a copy of the previous version of the software programme.

It should therefore be understood that the embodiments described above are intended to be exemplary only, and the scope of the invention is to be limited solely by the scope of the appended claims.

We claim:

1. A method of encrypting a derivative work using a cipher created from digital sources used to create the derivative work in order to ensure a legal distribution of the derivative work through public channels, comprising:
   obtaining machine-readable input from a creator of the derivative work that provides an identification of each digital source used to create the derivative work;
   extracting source data from each of the digital sources used to create the derivative work;
   locating a source data sequence for each of the extracted source data that is unique within a predetermined range of each of the extracted source data;
   saving the source data sequence for each of the extracted source data as a marker in a header section created for a derivative-encrypted work;
   selecting a portion of the source data following the source data sequence for each of the extracted source data;
   creating the respective encryption keys by processing the selected portion for each of the extracted source data;
   combining the respective encryption keys to create the cipher;
   encrypting the derivative work using the cipher to create the derivative-encrypted work;
   storing the derivative-encrypted work on a public server; and
   making the derivative-encrypted work available on the public server.

2. The method as claimed in claim 1 further comprising encoding the marker using an encoding algorithm prior to saving the marker in the header section of the derivative-encrypted work.

3. The method as claimed in claim 1 wherein creating the respective encryption keys using the selected portion for each of the extracted source data comprises:
   rounding data values in the selected portion for each of the extracted source data to preserve only higher order bits of each data value.

4. The method as claimed in claim 1 wherein combining the respective encryption keys to create the cipher comprises using the key as the cipher if only one digital source was used to create the derivative work.

5. The method as claimed in claim 1 wherein combining the respective encryption keys to create the cipher comprises EXCLUSIVE ORing (XORing) the respective values together to create the cipher.

6. The method as claimed in claim 1 wherein combining the respective encryption keys to create the cipher comprises adding the values together to create the cipher.

7. The method as claimed in claim 1 wherein encrypting the derivative work using the cipher to create a derivative-encrypted work comprises:
   dividing the derivative work into cipher-sized portions; and
   sequentially EXCLUSIVE ORing (XORing) the cipher with the respective cipher-sized portions until the entire derivative work is encrypted.

8. The method as claimed in claim 1 wherein encrypting the derivative work using the cipher to create a derivative-encrypted work comprises:
   dividing the source data from the derivative work into cipher-sized portions;
   sequentially adding the values in the cipher to the respective values in the cipher-sized portions of source data until the entire derivative work is encrypted.

9. A system for ensuring a legal distribution of a derivative work through public channels, comprising:
   a derivative work service server having a non-volatile memory, the derivative work service server being connected to a public network in such a way that it can be accessed by mix artists and consumers; and
   a software application stored on the non-volatile memory and available for download by the mix artists and the consumers, the software application comprising machine-executable code that permits the mix artists to upload derivative-encrypted works, which are derivative works encrypted using an encryption cipher created by processing source data extracted from respective digital sources used to create the derivative work, wherein the machine-executable code comprises program instructions that permit the mix artist to input to the machine-executable code an identity of each source art work used to create one of the derivative works and, if required, an identity of a digital source associated with each of the source art works, program instructions that open a copy of each digital source and extract source data there from, program instructions that locate a start point used to generate an encryption key from the source data of each digital source, program instructions that create the encryption key from the source data extracted from each digital source, program instructions for combining the encryption keys to create an encryption cipher; and program instructions for encrypting the derivative work and uploading the derivative-encrypted work to the derivative work service server, and the software application further comprising machine-executable code that permits the consumers to purchase derivative-encrypted works and download the derivative-encrypted works, and decrypt the derivative-encrypted work provided that the consumers are respectively in possession of a digital source for each source art work associated with respective digital sources used by the respective mix artists to create the respective derivative-encrypted works purchased by the respective consumers, so that the respective derivative-encrypted works can be decrypted using a decryption cipher created by processing source data extracted from the respective digital sources possessed by the consumer to create a respective decryption key from each of the digital sources possessed by the consumer, and combining the respective decryption keys to create the decryption cipher.

10. The system as claimed in claim 9 wherein the machine-executable code further comprises:
program instructions that permit the consumer to browse the derivative-encrypted works available on the derivative work service server; and
program instructions that permit the consumer to purchase one of the derivative, encrypted works available on the derivative work service server.

11. The system as claimed in claim 10 wherein the machine-executable code further comprises:
program instructions that determine if the consumer possesses a digital source for each source art work used to create a derivative work encrypted in a derivative-encrypted work purchased by the consumer;
program instructions that extract source data from each digital source;
program instructions that locate a start point used to generate a decryption key from the source data of each digital source;
program instructions that process the source data of each digital source to generate the decryption key;
program instructions that combine the decryption keys to create a decryption cipher; and
program instructions that decrypt and download the derivative-encrypted work to the consumer system to permit the consumer to render the derivative work.

12. The system as claimed in claim 11 wherein the machine-executable code further comprises program instructions that use an information push mechanism to display an option to purchase a digital source that is not possessed by the consumer.

13. The system as claimed in claim 9 further comprising program instructions that extract error correcting codes from a header section of the derivative-encrypted file in order to ensure that the decryption key(s) are identical to the encryption key(s) used to encrypt an encrypted mix in the derivative-encrypted work.

14. A method of decrypting a derivative-encrypted work acquired by a consumer comprising:
downloading by the consumer the derivative-encrypted work from a public server;
extracting header information from a header section of the derivative encrypted work;
obtaining from the header information source art work identifiers that indicate digital sources required to decrypt the derivative-encrypted work;
locating each of the digital sources on the consumer system;
extracting source data from each of the respective digital sources;
obtaining from the header information a marker for the respective digital sources that identifies respective starting points used in the extracted source data to generate respective decryption keys;
obtaining respective decryption key lengths from the header information;
selecting a portion of the extracted source data extracted from each digital source using the respective markers and decryption key lengths to create a respective decryption key associated with each digital source;
creating the respective decryption keys by processing the selected portions of source data;
combining the respective decryption keys to create a decryption cipher; and
decrypting the derivative-encrypted work using the decryption cipher to create a consumer mix.

15. The method as claimed in claim 14 wherein obtaining from the markers for the respective digital sources further comprises decoding the respective markers using a predetermined decoding algorithm.

16. The method as claimed in claim 14 further comprising storing the consumer mix on non-volatile memory of the consumer system.

17. The method as claimed in claim 14 wherein locating each of the digital sources on the consumer system further comprises prompting the consumer for digital source location information if any one of the digital sources cannot be located on the consumer system.

18. The method as claimed in claim 17 wherein if one or more of the digital sources are not available from non-volatile memory of the consumer system, the method further comprises displaying a warning message and further displaying an option to purchase the one or more missing digital sources.

\* \* \* \* \*